Sept. 19, 1950  H. F. MAYNES  2,523,134
FISHING REEL
Filed Oct. 5, 1946  3 Sheets-Sheet 1
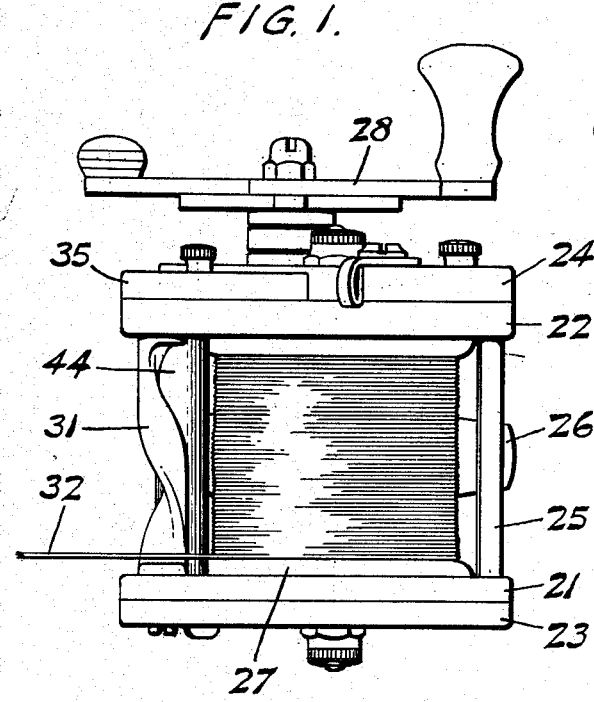
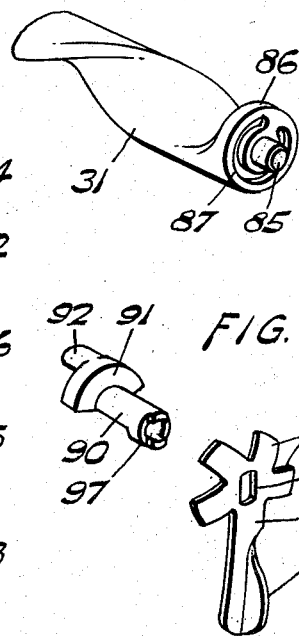
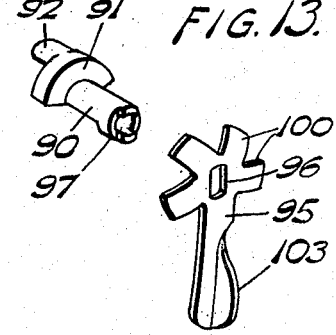
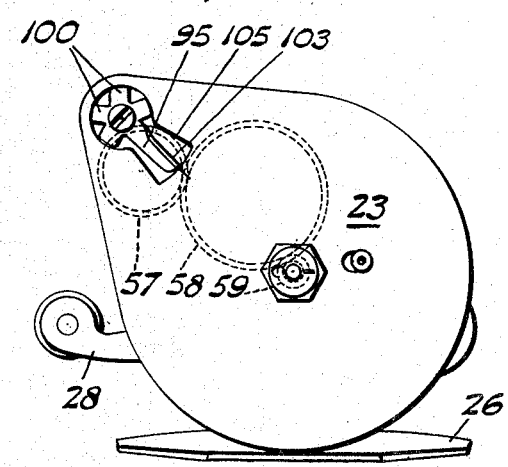
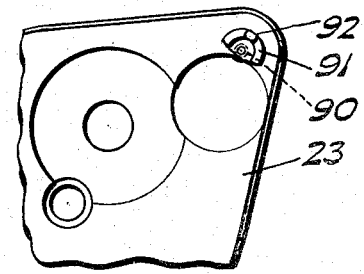
INVENTOR
HYLA F. MAYNES,
BY
Bean, Brooks, Buckley & Bean
ATTORNEYS Sept. 19, 1950        H. F. MAYNES        2,523,134
FISHING REEL
Filed Oct. 5, 1946        3 Sheets-Sheet 2
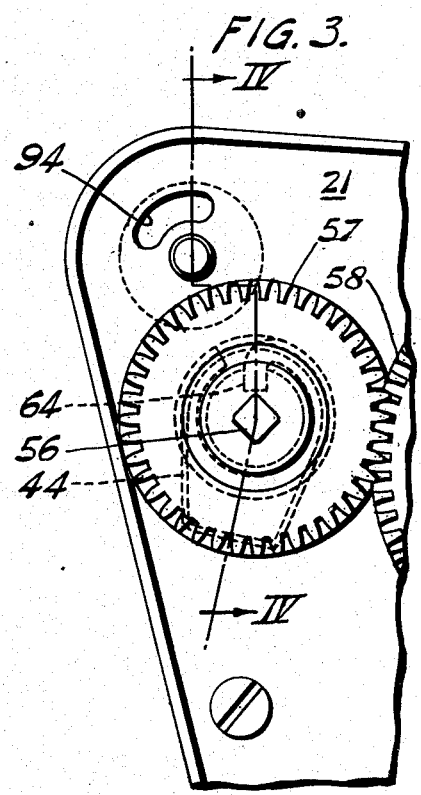
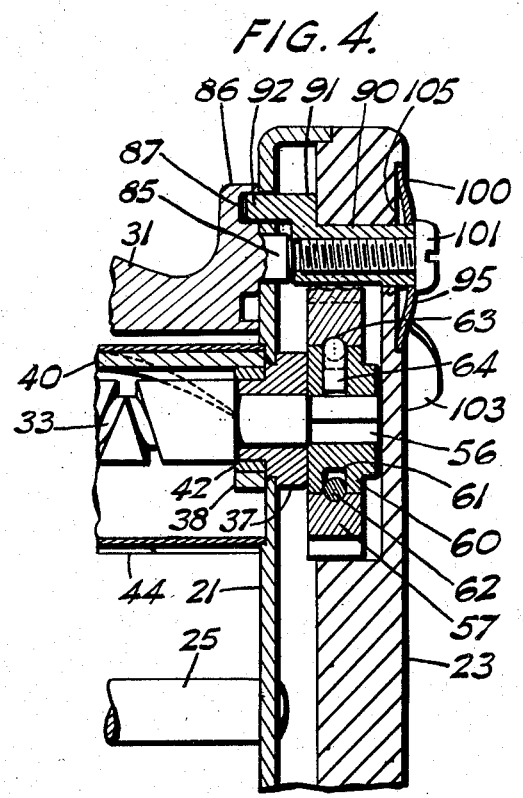
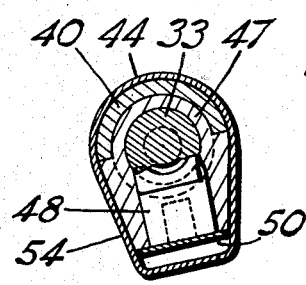
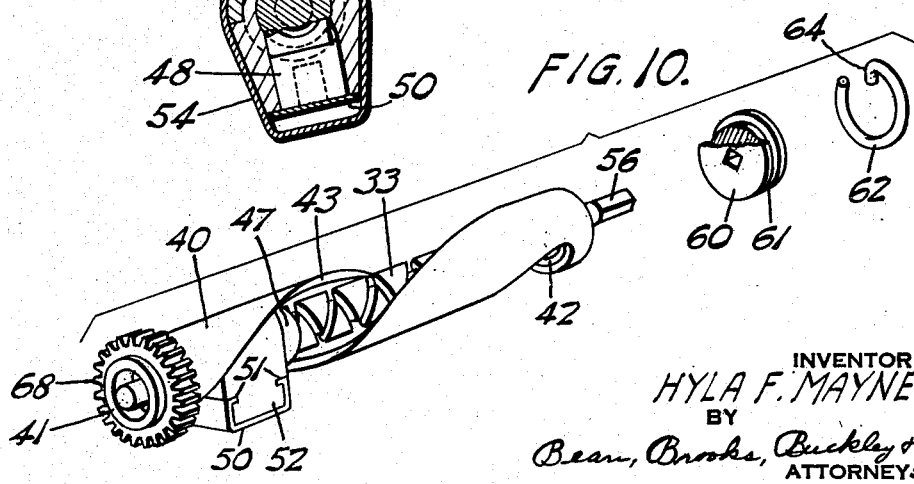
INVENTOR
HYLA F. MAYNES,
BY
Bean, Brooks, Buckley & Bean
ATTORNEYS Sept. 19, 1950    H. F. MAYNES    2,523,134
FISHING REEL Filed Oct. 5, 1946    3 Sheets-Sheet 3

INVENTOR
HYLA F. MAYNES,
BY
Bean, Brookes, Buckley & Bean
ATTORNEYS

Patented Sept. 19, 1950

2,523,134

UNITED STATES PATENT OFFICE 2,523,134

FISHING REEL

Hyla F. Maynes, Miami, Fla.; Emma C. Maynes executrix of said Hyla F. Maynes, deceased Application October 5, 1946, Serial No. 701,493

12 Claims. (Cl. 242—84.4)

This invention relates to fishing reels and particularly to means for feeding fishing line evenly onto the winding spools thereof.

The present invention comprises improvements in the general type of fishing reel shown in my prior Letters Patent No. 2,338,126, granted January 4, 1944, which relates to a fishing reel having a line guiding means in the form of a level wind shaft which oscillates angularly for shifting the line alternately from end to end of the winding spool. The present invention relates more particularly to improvements in the means for driving level wind shafts of the general type shown in the above identified patent and similar devices.

According to the present invention the relatively rapidly rotating double-threaded drive screw of the aforementioned Letters Patent is arranged to have entirely independent rigid bearing support in the opposite sides of the reel frame. Further, according to the improved construction of the present invention, means are provided to insure against harm to the level wind mechanism resulting from jamming or other failure to operate properly, particularly as such damage might arise out of attempts of a user to force the mechanism by pressure on the spool winding crank.

A further feature of the present invention resides in the provision of a construction whereby the oscillating level wind shaft is automatically synchronized with its drive means so as to oscillate in proper phase relationship with respect thereto. This automatic timing is accomplished without any attention on the part of one assembling and operating the reel. Assembly may be effected with the relative angular position of the level wind shaft entirely disregarded and subsequent use of the reel automatically brings the level wind shaft into the desired phase relationship with respect to its drive means.

As a further result of the construction of the present invention, the phase relationship of the level wind shaft may be quickly adjusted from the outside of the reel and such adjustment will be maintained until it is deliberately changed, even though the reel be disassembled and assembled without regard to the phase relationship of the level wind shaft.

Other objects and advantages of the present invention will be apparent to those skilled in the art from a perusal of the following description of a complete embodiment of the invention and a consideration of the accompanying drawings. It is to be understood, however, that the example set forth herein and in the drawings is by way of illustration only and the spirit and scope of the present invention are limited only as defined in the appended claims.

In the drawings:

Fig. 1 is a plan view of a surf casting type of reel;

Fig. 2 is a side elevational view thereof;

Fig. 3 is a fragmentary view taken similarly to Fig. 2 but on an enlarged scale and with the outer cover element removed;

Fig. 4 is a fragmentary cross-sectional view on the line IV—IV of Fig. 3;

Fig. 5 is a fragmentary elevational view of the inner wall of the cover element of the portion of the reel illustrated in Fig. 3;

Fig. 10 is an exploded perspective view of elements employed in driving the level wind shaft of the reel;

Fig. 11 is a transverse cross-sectional view through the mechanism of Fig. 10;

Fig. 12 is a detailed perspective view of the level wind shaft; and

Fig. 13 is a detailed perspective view of the level wind shaft timing elements.

Throughout the several figures of the drawings like characters of reference denote like parts and the reel shown herein in detail by way of example comprises outwardly opening cup-shaped end members 21 and 22 provided, respectively, with cover elements 23 and 24 for seating over the cup-shaped end members to provide opposite side chambers for purposes which will presently appear. The end members 21 and 22 are rigidly connected by a number of transverse columns or pillars 25. A saddle 26 for securement to a fishing rod may be connected rigidly to one or more of the pillars 25 in conventional manner.

Figure 6:
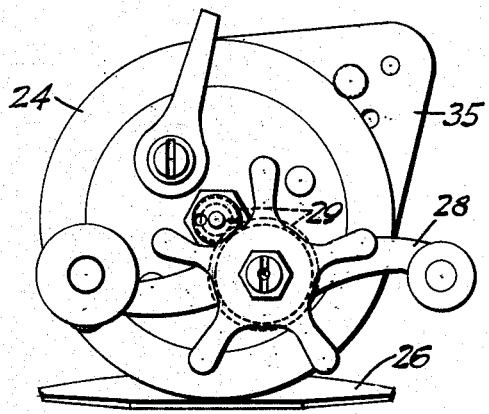
Fig. 6 is an elevational view of the opposite side of the reel from that shown in Fig. 2.

The reel includes a flanged line winding spool 27 journaled in the frame in any desired manner and adapted to be rotated by means of a turning handle or crank 28 to which it is connected by suitable gearing in the chamber between end member 22 and cover element 24. A gear and pinion drive for this purpose is indicated at 29 in Fig. 6.

Disposed between and journaled generally in the end members 21 and 22 is a level wind shaft 31 having a generally helical formation so that upon angular oscillation thereof it will present, to a fishing line 32, a trough moving from side to side of the spool 27. The line will ride from side to side in such trough and thus feed evenly onto the spool. Means are provided for oscillating the level wind shaft in synchronism with rotation of the spool, and the drive means for this purpose will now be described.

Figure 9:
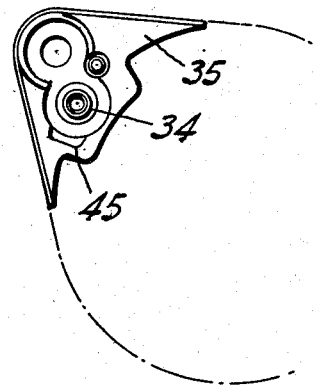
Fig. 9 is an elevational view of the inner face of a partial cover element for the portion of the reel illustrated in Fig. 7.
Figure 8:
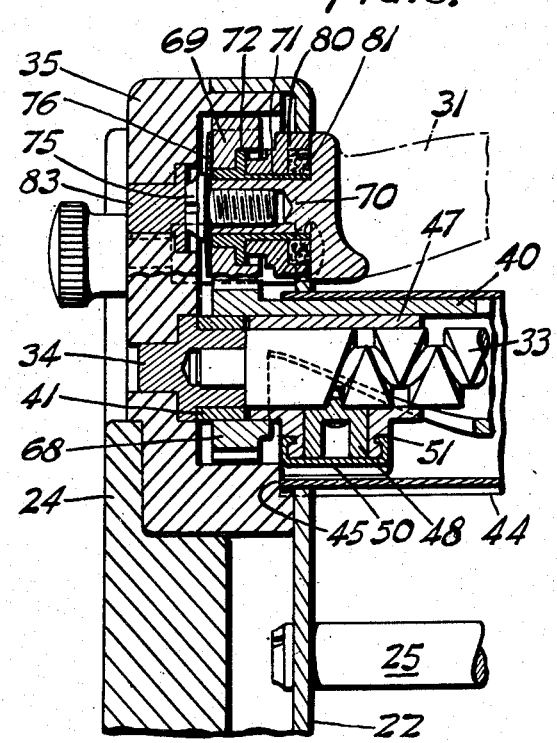
Fig. 8 is a fragmentary cross-sectional view on the line VIII—VIII of Fig. 7.

Referring particularly to Figs. 4, 8 and 10, a double threaded shaft 33 is journaled at one end in a bearing 34 which is fixed in an auxiliary cover element 35 which supplements the cover element 24 for end member 22. The inner face of the supplemental cover element 35, with bearing 34 fixed therein, is shown in Fig. 9. The opposite end of double-threaded screw 33 is journaled in a bearing 37 which has a reduced portion seating in end member 21 and riveted therein as shown at 38 in Fig. 4. The fixed bearings 34 and 37 thus provide relatively independent means for supporting double-threaded screw 33, which rotates relatively rapidly during operation, and also provide end thrust bearings therefor. The relatively rapidly rotating double-threaded screw 33 presents the greatest bearing problem in the entire level wind mechanism and therefore, the provision of an entirely independent bearing means marks a significant improvement in the construction of mechanism of this kind.

A sleeve 40 is disposed co-axially about double-threaded screw 33 and is mounted for independent rotation relative thereto in a manner which will now be described. Sleeve 40 has internal bushings 41 and 42 pressed into its opposite ends as shown in detail in Figs. 8 and 4, respectively, and also in Fig. 10. The bushings 41 and 42 have bearing upon reduced external peripheries provided at the inner ends of bearings 34 and 37, respectively. The radial walls of bearings 34 and 37 adjacent the reduced peripheral bearing portions provide end thrust faces for sleeve 40, through its bushings 41 and 42.

Sleeve 40 has a generally helical or other cam-like formation extending therealong which, in the illustrated embodiment, takes the form of a helical slot 43. Sleeve 40 is disposed within a tubular member 44 of substantially D shape in cross-section that extends between the end members 21 and 22, its right end seating in a recess in the inner face of end member 21 and its left end extending through a complementary opening formed in end member 22. Tubular member 44 is held in correct endwise position by engagement in the bottom of a recess 45 in auxiliary cover element 35.

Figure 7:
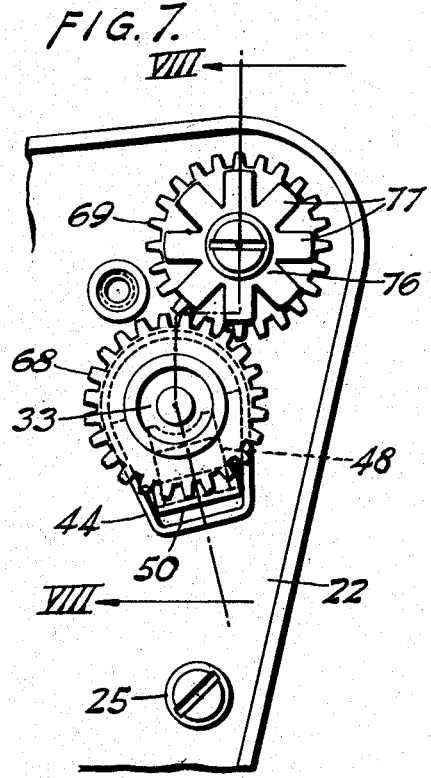
Fig. 7 is a fragmentary elevational view taken similarly to Fig. 6 but on an enlarged scale and with the outer cover element removed.

A carriage 47 is slidable on double-threaded shaft 33 and has a pawl 48 for engagement in the groove of double-threaded shaft 33 as shown in Figs. 7, 8, and 11. Pawl 48 has a cylindrical head portion which is retained in a recess in carriage 47 by means of a plate 50 which is slidable in undercut grooves formed on the carriage as indicated at 51 in Figs. 8 and 10. The portion 52 of carriage 47 which receives plate 50 comprises a lateral enlargement of the carriage, and this enlargement extends into and rides in the lateral longitudinal enlargement 54 of tubular member 44 as shown in Fig. 11.

The end of double-threaded screw 33 which projects beyond bearing 37 is squared as at 56 and supports a pinion 57 which meshes with an intermediate gear 58, which in turn meshes with and is driven by a pinion 59 fixed co-axially with spool 27. The pinion 57 is specially constructed to avoid overload and possible resulting harm to the level wind mechanism. The leverage or mechanical advantage from the handle or crank 28 to the oscillating sleeve 40 is relatively high and, therefore, any jamming or other failure of the level wind mechanism to operate properly might result in serious damage thereto if the operator continues to apply force to the crank 28. Special provision is made in the present construction to avoid such a possibility.

Pinion 57 is provided with a separate central hub element 60 which has an annular peripheral groove 61 of sufficient depth to receive wholly therein a spring wire loop 62. The inner mating periphery of the pinion proper has a relatively more shallow annular groove 63 which in depth is equal to or slightly less than the radius of the wire of the spring loop 62. One end of spring loop 62 is bent radially inwardly as at 64 to engage a radial opening in hub element 60. The spring loop 62 is accordingly locked with respect to the hub element 60 and is under initial tension which urges it outwardly into groove 63 of the pinion 57 proper.

The outward tension of spring loop 62 causes pinion 57 to frictionally drive hub element 60 and, accordingly, double-threaded screw 33. However, in the case of overload, the frictional driving force against spring loop 62 is overcome, and thus only a predetermined maximum driving torque may be exerted upon double-threaded screw 33. In assembling and disassembling pinion 57 from hub element 60, relative axial movement of the two parts forces spring loop 62 entirely into groove 61 of the hub element.

In operation, rotation of spool 27 causes timed continuous rotation of double-threaded screw 33 through the gear train 59, 58, and 57, and such continuous rotation reciprocates carriage 47 back and forth across the reel. Since enlargement 52 extends through the helical slot 43 of sleeve 40 and since the carriage 47 is held against rotation by engagement of its enlargement 52 in the extension 54 which extends longitudinally of tubular member 44, the to-and-fro movement of carriage 47 causes oscillation of member 40 by engagement against the sides of slot 43 thereof. This oscillation is transmitted to level wind shaft 31 by means of a pair of pinions 68 and 69. In the illustrated embodiment, pinion 68 is formed directly on sleeve 40 and pinion 69 has friction clutch engagement with level wind shaft 31 in a manner which will now be described.

The left end of level wind shaft 31, shown in detail in Fig. 8, is reduced as at 70 to receive a sleeve 71 which is preferably very slightly longer than reduced portion 70 and has an intermediate outwardly extending annular flange 72. Pinion 69 has a stepped bore which seats over sleeve 70 and flange 72. The outer end of reduced portion 70 is internally threaded to receive a screw 75 which also retains a washer 76 having radiating spring fingers 77. Screw 75 securely locks sleeve 71 with respect to reduced portion 70 but spring fingers 77 merely engage pinion 69 with resilient frictional force, pinion 69 being otherwise free to rotate on sleeve 71.

The inner or right hand end of sleeve 71, as viewed in Fig. 8, comprises a journal for level wind shaft 31 which is rotatable in a bearing 80 which has a relatively close fit in the wall of end member 22 but is removable therefrom with the level wind shaft upon disassembly of the latter from the reel. Bearing 80 is provided with an annular recess for receiving packing material as at 81.

Supplemental cover element 35 is preferably provided with an annular metallic plug or insert 83 whose inner face is engaged by the head of screw 75 to take the end thrust at the left hand end of the level wind shaft.

The right hand end of level wind shaft 31 has a pintle portion 85 journaled in the wall of end member 21 and a flanged enlargement 86 adjacent the inner wall of the end member 21. Flange 86 is provided with an arcuate groove 87 shown in detail in Fig. 12 and level wind timing elements for cooperation therewith are shown in detail in Fig. 13. These elements comprise a shaft element 90 having an offset enlargement 91 and an eccentric pin 92. Shaft 90 is rotatably mounted in the cover element 23 coaxially with the level wind shaft. Eccentric pin 92 is engageable in arcuate slot 87, and an arcuate clearance slot 94 is formed in end member 21 as shown in Fig. 3 to permit free passage of pin 92 therethrough in various angular positions of adjustment about the axis of shaft 90.

A resilient retaining element for shaft 90 is shown in perspective at 95 in Fig. 13 and includes a central non-circular aperture 96 which fits over the complementarily formed end 97 of shaft 90. The restraining element 95 includes outwardly directed spring fingers 100 which engage the exterior wall of cover element 23 when the restraining element is in assembled position on the end of shaft 90, where it is held by a screw 101 which threads into shaft 90. Retaining element 95 has an outwardly directed flange 103 which serves as a manipulating portion for angularly adjusting shaft 90 and, accordingly, eccentric pin 92.

The frictional resistance introduced by spring fingers 100 may be of sufficient magnitude to require loosening of screw 101 to effect angular adjustment of pin 92 or it may be such as to permit manual adjustment without loosening screw 101. In any event this frictional force must be greater than the frictional driving force of spring fingers 77 of washer 76 which transmit torque from pinion 69 to the level wind shaft. The reason for this is found in the manner of accomplishing automatic timing operation of the level wind shaft. Also the frictional driving force of spring 62 on pinion 57 is greater than the frictional driving force of spring fingers 77, so that the frictional driving force of spring 62 slips only under extreme loads when damage to the double-threaded screw mechanism might result.

In assembling the level wind shaft no attention need be paid to its timing or phase relationship with respect to the position of carriage 47 along double-threaded screw 33. To assemble the level wind shaft in the reel it must merely be disposed in such position that pin 92 enters arcuate groove 87 in some position. Subsequently, as operation of the level wind drive mechanism oscillates level wind shaft 31 during the first reciprocation following assembly, it will oscillate the level wind shaft only until eccentric pin 92 and either end of arcuate groove 87 come into abutment. Even though the level wind drive pinion 69 continues to be rotated in the same direction by the level wind drive mechanism, pinion 69 will slip relative to the level wind shaft by overcoming the friction of spring fingers 77.

However, as soon as oscillation of drive pinion 69 reverses through continued operation of the level wind drive means, pin 92 and the end of arcuate slot 87 will move apart, the groove 87 will oscillate freely about pin 92, and the level wind shaft is in proper timed phase relationship with respect to its oscillating mechanism. In Fig. 2, the restraining element 95 is shown in normal mid-position whereby the level wind shaft will distribute line uniformly across spool 27. Under certain conditions it is desired to wind more line on one side of the spool than on the other, usually as a result of undue build-up of line at the other side of the reel. According to the present construction adjustment for this purpose is instantaneously effected by shifting the angular position of element 95 in one direction or the other. As indicated in Figs. 2 and 4, the exterior surface of cover element 23 is recessed as at 105 to receive the restraining element 95.

What is claimed is:

1. In a fishing reel, a rotatable line winding spool, a spaced level wind element adapted to distribute line uniformly on said spool by oscillation through a predetermined arcuate path, level wind element drive means including an oscillatable member and transmission means connecting said member with said winding spool whereby rotation of the spool produces timed oscillation of said member of predetermined amplitude, stop means engageable with said level wind element to constrain it to movement within the limits of said predetermined arcuate path, and a friction drive connection between said oscillatable member and said level wind element whereby the level wind element may be assembled in any random angular position within its arcuate path and will subsequently be automatically confined to oscillation in said path by said stop means through slippage of said friction drive connection.

2. In a fishing reel, a rotatable line winding spool, a spaced level wind element adapted to distribute line uniformly on said spool by oscillation through a predetermined arcuate path, level wind element drive means including an oscillatable member and transmission means connecting said member with said winding spool whereby rotation of the spool produces timed oscillation of said member of predetermined amplitude, stop means engageable with said level wind element to constrain it to movement within the limits of said predetermined arcuate path, and a yieldable drive connection between said oscillatable member and said level wind element whereby the level wind element may be assembled in any random angular position within its arcuate path and will subsequently be automatically confined to oscillation in said path by cooperation between said stop means and said yieldable drive connection.

3. In a fishing reel, a rotatable line winding spool, a spaced level wind element adapted to distribute line uniformly on said spool by oscillation through a predetermined arcuate path, level wind element drive means including an oscillatable member and transmission means connecting said member with said winding spool whereby rotation of the spool produces timed oscillation of said member of predetermined amplitude, stop means engageable with said level wind element to constrain it to movement within the limits of said predetermined arcuate path, and a friction drive connection between said oscillatable member and said level wind element whereby the level wind element may be assembled in any random angular position within its arcuate path and will subsequently be automatically confined to oscillation in said path by said stop means through slippage of said friction drive connection, said stop means being angularly adjustable to selectively alter the disposition of said predetermined arcuate path.

4. In a fishing reel, a rotatable line winding spool, a spaced level wind element adapted to distribute line uniformly on said spool by timed oscillation through a predetermined arcuate path, stop means engageable with said level wind element to constrain it to movement within the limits of said predetermined path, and transmission means between said spool and said level wind element for oscillating the latter upon rotation of the former, said transmission means including a friction drive connection whereby the level wind element may be assembled in any random angular position and will subsequently be automatically confined to oscillation in said predetermined arcuate path by said stop means through slippage of said friction drive connection.

5. In a fishing reel, a rotatable line winding spool, a spaced level wind element adapted to distribute line uniformly on said spool by timed oscillation through a predetermined arcuate path, stop means engageable with said level wind element to constrain it to movement within the limits of said predetermined path, and transmission means between said spool and said level wind element for oscillating the latter upon rotation of the former, said transmission means including a yieldable drive connection whereby the level wind element may be assembled in any random angular position and will subsequently be automatically confined to oscillation in said predetermined arcuate path by cooperation between said stop means and said yieldable drive connection.

6. In a fishing reel, a rotatable line winding spool, a spaced level wind element adapted to distribute line uniformly on said spool by timed oscillation through a predetermined arcuate path, stop means engageable with said level wind element to constrain it to movement within the limits of said predetermined path, and transmission means between said spool and said level wind element for oscillating the latter upon rotation of the former, said transmission means including a friction drive connection whereby the level wind element may be assembled in any random angular position and will subsequently be automatically confined to oscillation in said predetermined arcuate path by said stop means through slippage of said friction drive connection, said stop means being angularly adjustable to selectively alter the disposition of said predetermined arcuate path.

7. In a fishing reel, a rotatable line winding spool, a spaced level wind element adapted to distribute line uniformly on said spool by timed oscillation through a predetermined arcuate path, stop means engageable with said level wind element to constrain it to movement within the limits of said predetermined path, and transmission means between said spool and said level wind element for oscillating the latter upon rotation of the former, said transmission means including a yieldable drive connection whereby the level wind element may be assembled in any random angular position and will subsequently be automatically confined to oscillation in said predetermined arcuate path by cooperation between said stop means and said yieldable drive connection, said stop means being angularly adjustable to selectively alter the disposition of said predetermined arcuate path.

8. In a fishing reel, a rotatable line winding spool, a spaced level wind element adapted to distribute line uniformly on said spool by oscillation through a predetermined arcuate path, level wind element drive means including an oscillatable member, and transmission means connecting said member with said winding spool whereby rotation of the spool produces timed oscillation of said member of predetermined amplitude, stop means engageable with said level wind element to constrain it to movement within the limits of said predetermined arcuate path, a friction drive connection between said oscillatable member and said level wind element whereby the level wind element may be assembled in any random angular position within its arcuate path and will subsequently be automatically confined to oscillation in said path by said stop means through slip of said friction drive connection, said transmission means connecting the winding spool and the oscillatable member including friction drive means having a greater maximum driving force than said first-mentioned friction drive connection, to limit the maximum driving force transmittable to the oscillatable member without affecting the automatic timing of the level wind element by the stop means and the first-mentioned friction drive connection.

9. In a fishing reel, a rotatable line winding spool, a spaced level wind element adapted to distribute line uniformly on said spool by oscillation through a predetermined arcuate path, level wind element drive means including an oscillatable member, and transmission means connecting said member with said winding spool whereby rotation of the spool produces timed oscillation of said member of predetermined amplitude, stop means engageable with said level wind element to constrain it to movement within the limits of said predetermined arcuate path, a yieldable drive connection between said oscillatable member and said level wind element whereby the level wind element may be assembled in any random angular position within its arcuate path and will subsequently be automatically confined to oscillation in said path by cooperation between said stop means and said yieldable drive connection, said transmission means connecting the winding spool and the oscillatable member including a second yieldable drive connection having a greater maximum driving force than said first-mentioned yieldable drive connection, to limit the maximum driving force transmittable to the oscillatable member without affecting the automatic timing of the level wind element by the stop means and the first-mentioned yieldable drive connection.

10. In a fishing reel, a frame comprising spaced side members, a rotatable line winding spool between said side members and level wind means including a line guiding element and means for imparting to and fro movement thereto, said last-mentioned means including a reversely threaded shaft and a member oscillatable by rotation and disposed about said shaft, a drive element reciprocable by rotation of the reversely threaded shaft and operable to oscillate said oscillatable member, said side members having coaxial annular bearing elements fixedly associated therewith, said reversely threaded shaft being journaled directly in said bearing elements and said oscillatable member having bearing on the peripheries of said bearing elements.

11. In a fishing reel, a frame comprising spaced side members, a rotatable line winding spool between said side members and level wind means including a line guiding element and means for imparting to and fro movement thereto, said last-mentioned means including a reversely threaded shaft and a member oscillatable by rotation and disposed about said shaft, a drive element reciprocable by rotation of the reversely threaded shaft and operable to oscillate said oscillatable member, said side members having coaxial annular bearing elements fixedly associated therewith, said reversely threaded shaft and said oscillatable member each having independent direct bearing engagement with said bearing elements.

12. In a fishing reel, a frame comprising spaced side members, a rotatable line winding spool between said side members and level wind means including a line guiding element and means for imparting to and fro movement thereto, said last-mentioned means including a reversely threaded shaft and a member oscillatable by rotation and disposed about said shaft, a drive element reciprocable by rotation of the reversely threaded shaft and operable to oscillate said oscillatable member, said side members having coaxial annular bearing elements fixedly associated therewith, said reversely threaded shaft being journaled directly in said bearing elements and having thrust bearing engagement directly against inner faces of said bearing elements, and said oscillatable member having bearing on external peripheries of said bearing elements.

HYLA F. MAYNES.

REFERENCES CITED

The following references are of record in the file of this patent:

UNITED STATES PATENTS

| Number | Name | Date |
| --- | --- | --- |
| 1,541,198 | Teter | June 9, 1925 |
| 1,629,098 | Drexler | May 17, 1927 |
| 2,244,889 | Maynes | June 10, 1941 |
| 2,338,126 | Maynes | Jan. 4, 1944 |

FOREIGN PATENTS

| Number | Country | Date |
| --- | --- | --- |
| 671,216 | Germany | Feb. 2, 1939 |